United States Patent [19]

von Alpen et al.

[11] 4,424,262

[45] Jan. 3, 1984

[54] ELECTROCHEMICAL STORAGE CELL

[75] Inventors: Ulrich von Alpen, Schlossborn; Axel Krauth, Selb, both of Fed. Rep. of Germany

[73] Assignee: Varta Batterie Aktiengesellschaft, Hannover, Fed. Rep. of Germany

[21] Appl. No.: 313,628

[22] Filed: Oct. 21, 1981

[30] Foreign Application Priority Data

Oct. 25, 1980 [DE] Fed. Rep. of Germany ....... 3040394

[51] Int. Cl.³ .......................................... H01M 14/00
[52] U.S. Cl. ........................................ 429/8; 429/26; 429/104; 429/120; 429/191
[58] Field of Search ................ 429/26, 104, 120, 191, 429/8

[56] References Cited

U.S. PATENT DOCUMENTS

| | | | |
|---|---|---|---|
| 3,537,907 | 11/1970 | Wilson | 429/120 |
| 3,833,420 | 9/1974 | Will | 429/104 |
| 4,038,462 | 7/1977 | Rohr | 429/104 X |
| 4,038,465 | 7/1977 | Ludwig et al. | 429/104 |
| 4,232,098 | 11/1980 | Park | 429/104 |
| 4,332,866 | 6/1982 | Jacquelin et al. | 429/104 X |

*Primary Examiner*—Charles F. LeFevour
*Attorney, Agent, or Firm*—Herbert L. Lerner; Laurence A. Greenberg

[57] ABSTRACT

Electrochemical storage cell with liquid sodium anode and liquid sulfur cathode disposed in a multiplicity of parallel-connected anode and cathode spaces in a part made of a ceramic, ion-conducting solid electrolyte material. The solid electrolyte part comprises profiled ceramic plates which have been sintered together and form mutually parallel channels with thin partitioning walls. The anode spaces formed by the channels are open at the upper end and closed at the opposite end, and the upper ends communicate with a sodium supply. The cathode spaces are open at the upper and lower ends and communicate with a sulfur and cell reaction products supply. Metallic collectors are sunk into the cathode spaces.

2 Claims, 2 Drawing Figures

ELECTROCHEMICAL STORAGE CELL

BACKGROUND OF THE INVENTION

1. Field of the Invention

The invention relates to an electrochemical storage cell with anode spaces containing liquid sodium and cathode spaces containing liquid sulfur.

2. Description of the Prior Art

In designing sodium/sulfur cells aimed at better and better energy utilization of the highly promising electrochemical system, efforts have also been directed, among others, at greater compactness of such units because it is important, above all, to have the two molten active materials interact over or along reaction surfaces as expansive as possible while being juxtaposed as closely as possible. In this endeavour, the actual reaction chamber, as the core of a sodium/sulfur cell, merits superior importance.

In most cells of the above definition the sodium anode and the sulfur cathode are each divided into a multiplicity of parallel-connected, vertical cavities.

German Patent DE-PS 25 13 649 discloses an arrangement in which numbers of parallel anodic and cathodic channels completely penetrate a homogeneous solid electrolyte part, the anode spaces being unilaterally closed at one end and the cathode spaces unilaterally closed at the opposite end of the solid electrolyte part.

As in other known cells, the channel structures end in equalizing spaces for the liquid reactant of the one as well as for the liquid reactant of the other polarity, at the same time serving as supply reservoirs. The equalizing spaces at both ends of the solid electrolyte take into account that each charging and discharging process takes place while the liquid active material changes its volume. For example, during the discharge according to the general equation $2\,Na + 3/2\,S_2 \rightarrow Na_2S_3$, the sodium level decreases in its supply container as the sodium migrates through the $Na^+$-conducting partitioning walls of the solid electrolyte part from the anode spaces to the cathode spaces. In this process, too great a reduction of the anode space surface contacted by the sodium, made conductive by graphiting, must be avoided. The same applies to the cathode channels and their equalizing space, from which the sodium disappears during the charging process.

Measures are known from German Published Non-Prosecuted Application DE-OS 24 31 152 which make it possible to spread the liquid reactants over the partitioning wall surfaces to a great extent at all times, and to keep them there. This is accomplished by lining the channels with capillary-active, porous coatings.

However, the deficiencies of insufficient mass utilization and heat imbalance could still not be overcome by the compact configuration, favorable as viewed from the aspect of energy density, of know sodium/sulfur cells. The heat imbalance stems from the fact that the operation of such a cell is subject to certain temperature conditions corresponding to very different thermal levels and very difficult to balance. Therefore, considerable heat losses must be tolerated as a rule because the heat exchange between the temperature levels does not occur automatically in the desired manner.

The temperature conditions to be taken into account are:

1. the melting pointing of Na:98° C.,
2. the melting points of the possible cathod substances or cell reaction products:
   S:115° C.
   $Na_2S_2$:242° C.
   $Na_2S_4$:285° C.
3. the temperature in the reaction chamber:300°–350° C.

SUMMARY OF THE INVENTION

Accordingly, it is an object of the invention to provide an electrochemical storage cell based on the sodium/sulfur system, designed so that the liquid reactants fed in can be more efficiently utilized for current generation. Another object of the invention is to minimize heat losses and provide better temperature control inside the cell.

With the foregoing and other objects in view, there is provided in accordance with the invention an electrochemical storage cell comprising a part made of a ceramic, ion-containing solid electrolyte material, constituting ceramic plates which have been sintered together and form mutually parallel channels with thin partitioning walls, with alternate parallel channels open at the upper end and closed at the opposite end forming anode spaces and containing liquid sodium, and parallel channels adjacent the alternate channels open at the upper and lower ends forming cathode spaces and containing liquid sulfur and cell reaction products, said openings at the upper end of the anode spaces connected to a sodium supply, said cathode spaces connected to a sulfur and cell reaction products supply, and metallic current collectors extending into the cathode spaces.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

DETAILED DESCRIPTION OF THE DRAWINGS

Figure 1:
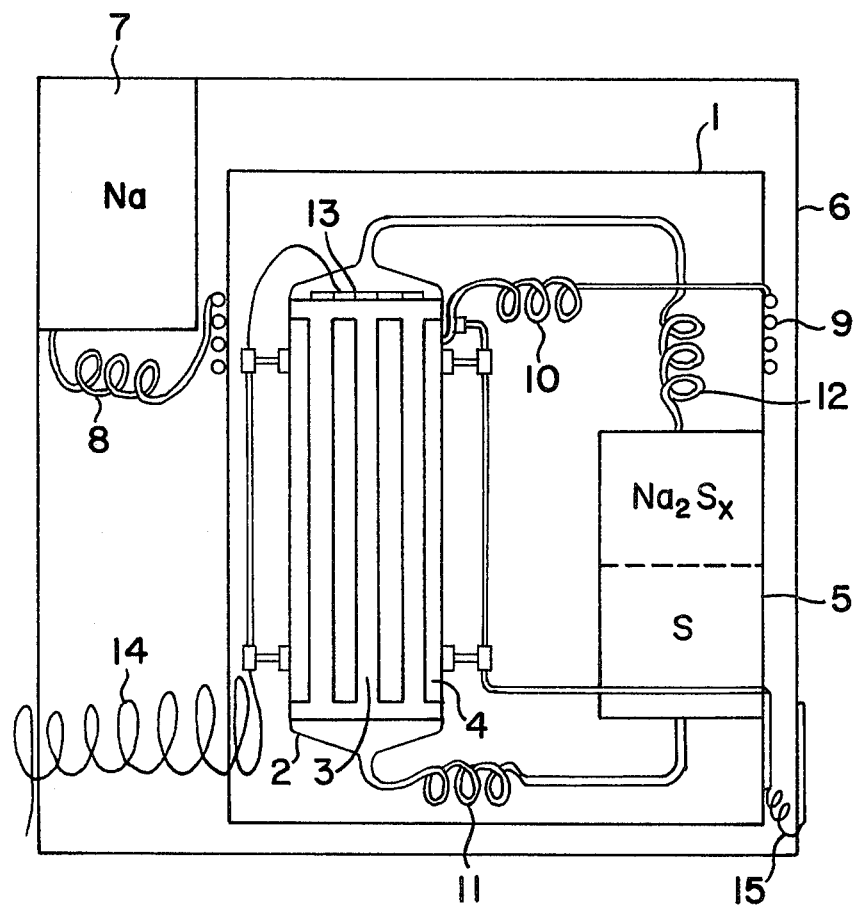

The invention however, together with additional objects and advantages thereof will be best understood from the following description when read in connection with the accompanying drawings, in which:

FIG. 1 shows schematically the overall construction of the storage cell according to the invention, in which a ceramic reaction vessel is formed to provide anode channels and cathode channels with solid electrolyte plates separating the channels. A supply tank separate from the vessel feeds Na to the anode channels and another supply tank feeds sulfur to the cathode channels. The connecting conduits contain delay lines to thermally uncouple the tanks from the vessel, and an inner and an outer radiation shield to prevent heat loss and keep the heat load in balance.

Figure 2:
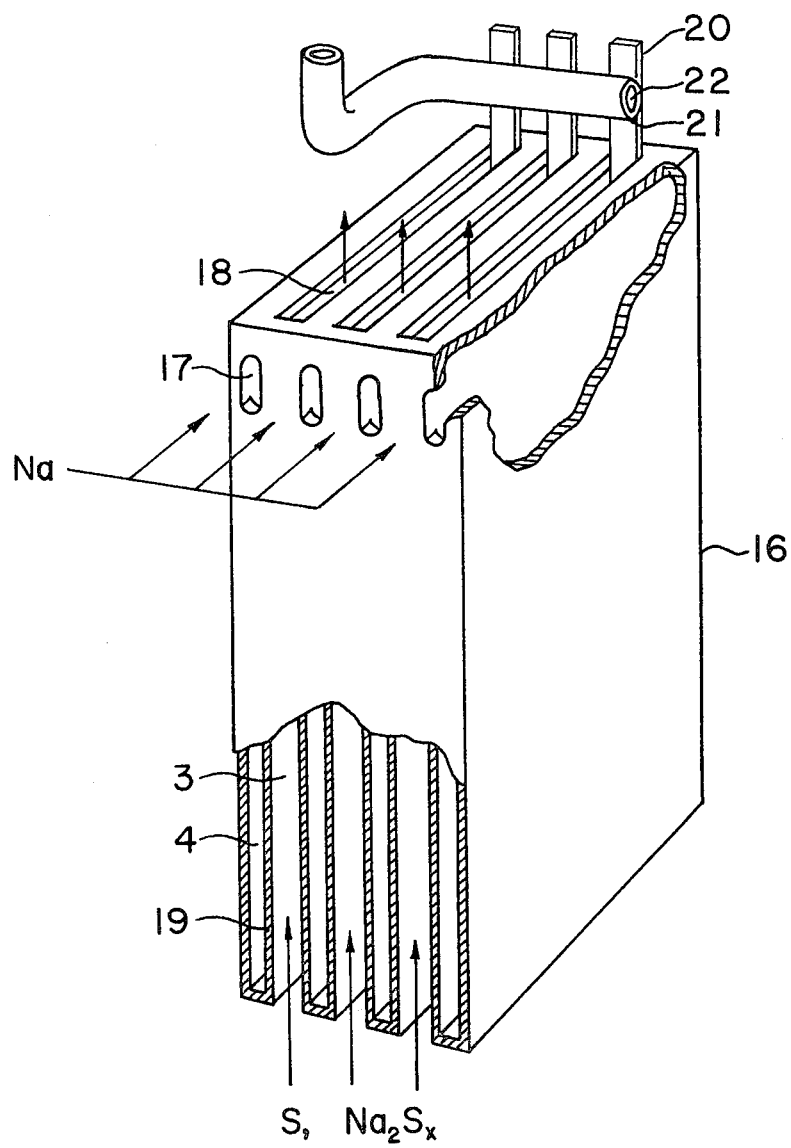

FIG. 2 shows a preferred embodiment of the reaction aggregate, illustrating the arrangement of channels as well as openings to the channels.

DETAILED DESCRIPTION OF THE INVENTION

The solid electrolyte part consists of profiled ceramic plates sintered together which form mutually parallel channels with thin partitioning walls. The anode spaces are open at the upper end and closed at the opposite end, and the upper ends communicate with the sodium supply, whereas the cathode spaces are open at their upper and lower ends and communicate with a supply of sulfur and of the cell reaction products. Metallic collectors are sunk into the cathode spaces. This solid electrolyte part in which the reaction between sodium and sulfur or sulfides occurs is sometimes termed reaction aggregate.

The general arrangement of the storage cell according to the invention, provides that there be a physical separation of the reactant supplies from the actual reaction aggregate, namely, the solid electrolyte part so that sodium on the one hand and sulfur on the other can be kept in readiness in external supply tanks at temperatures only slightly above the respective melting points the various thermal levels from each other by delay lines to prevent a rapid thermal transfer, i.e. a rapid transfer of heat between different temperature levels, thereby causing improper heat balance with undesired temperatures in the cell with consequent inefficient operation. These delay lines may consist of helically coiled V4A tubes, the diameter of which depends on the viscosity, and their length on a heat flow which can be tolerated.

As may be seen from Table 1, the thermal conductivity ratios of the Na and S melts at the appropriate temperatures are $10^3:1$ and the viscosity ratios 100:1. Therefore, the heat flow to the Na melt can be uncoupled by a thin capillary tube while the S-carrying line can be of relatively large diameter because of the low thermal conductivity and high viscosity.

TABLE 1

| | | The Physical Properties of Molten Sodium, Sulfur and Sodium Polysulfides | | | | | |
|---|---|---|---|---|---|---|---|
| | | $S_8$ | $Na_2S_5$ | $Na_2S_4$ | $Na_2S_3$ | Na | |
| Melting Point (°C.) | | 113~120 | 185~298 | 255~300 | 224~320 | 98 | |
| El. Resistance (Ωcm) | 300° C. | $5 \times 10^7$ | 4.5 | 3.6 | 2.4 | $13.1 \times 10^{-6}$ | at 200° C. |
| | 350° C. | $1.1 \times 10^7$ | 2.6 | 2.1 | 1.5 | | |
| Viscosity (P) | 300° C. | 22.0 | .51 | .39 | .38 | $7 \times 10^{-3}$ | at 100° C. |
| | 350° C. | 4.5 | .19 | .18 | .18 | $4.5 \times 10^{-3}$ | at 200° C. |
| Density (g cm$^{-3}$) | 300° C. | 1.698 | 1.898 | 1.917 | 1.902 | .927 | at 100° C. |
| | 350° C. | 1.669 | 1.862 | 1.886 | 1.874 | .909 | at 200° C. |
| Surface Tension | 300° C. | 47.5 | 123.7 | 130.7 | 175.4 | | |
| (mNm$^{-1}$) | 350° C. | 43.9 | 120.4 | 128.0 | 172.4 | | |
| Thermal Capacity | 200° C. | .331 | | | | .331 | at 100° C. |
| (kcal kg$^-$ degrees$^{-1}$) | | | | | | .32 | at 200° C. |
| Thermal Conductivity | 200° C. | $1.5 \times 10^{-3}$ | | | | .806 | at 100° C. |
| (Wcm$^{-1}$ degrees$^{-1}$) | | | | | | .815 | at 200° C. | of the supply substances. At the same time, the active positive S-mass can flow through the reaction aggregate in closed circulation for optimum utilization. This flow-through can be accomplished either by thermal convection utilizing heat produced by formation of the $Na_2S_x$ compounds, or by repumping. The viscosity of the $Na_2S_x$ compounds decreases with decreasing discharge level so that the reaction product can be conducted away readily. As will be seen from Table 1, of the sulfur compounds, sulfur has the lowest viscosity and the $Na_2S_x$ compounds have decreasing viscosities with decreasing sulfur content. Moreover, a lower viscosity can be obtained by adding organic solvents.

Due to the external volume control according to the invention, it is also possible to have the various volumes float thermally adapting to the respectively formed sodium pulysulfides and, hence, to the corresponding charging state.

Joule's heat loss in the reaction aggregate may be the primary source for heating the given active masses.

Furthermore, by including the Na tank in a radiation shield enveloping the entire arrangement, the radiation loss of the reaction aggregate, which increases as the 4th power of the operating temperature, can be utilized to maintain the melting temperature of sodium and to equalize the calorific balance. Success is achieved with this measure in increasing the life of the cell by about five times the life which would result from the lack of intermediate temperature heat containers with unimpeded heat conduction.

The intermediate thermal levels present a situation in which uncoupling thermally the mechanical holding means as well as the electric lead-throughs for the current collectors, which uncoupling also helps prolong the cell life, may be achieved. Uncoupling thermally, according to the invention, is effected by keeping apart But this necessitates collecting the current on the Na side directly at the reaction chamber because, due to the small cross-sectional area of the line, Joule's heat losses along the Na capillaries are high - despite the low specific electric resistance of $13 \times 10^{-6}$ Ohm - so that melting of the capillaries must be feared. For example, for a 0.3 cm diameter capillary 50 cm long and a 250 A current load the resultant energy loss $I_2R$ is 140 W.

Within the radiation shield mentioned, the cell is advantageously equipped with another radiation shield enveloping the reaction aggregate and the S or $Na_2S_x$ tank. The central section of the Na supply line of larger inside diameter is helically wound around this second radiation shield. In this way, the capillary emanating from the Na tank, when transitioning to the central line section, is coupled to the intermediate temperature level of the S tank and from it coupled once more capillarily to the high temperature level of the reaction chamber, respectively uncoupled from it thermally. Thus, the Na supply line is not subject to an intense heat, i.e. a hot spot, but instead to three zones of temperature, a relatively cool zone, an intermediate zone, and a warm zone in which there are no hot spots. The delay line in the form of a thin capillary tube in the cool zone avoids difficulties such as melting of the capillary tube.

The sulfur, present in liquid form, flows into the reaction chambers which were lined with graphite fleece for the sintering process. The $Na_2S_x$ which forms is separated from the viscous sulfur by being heated at an exchange diaphragm by means of thermal convection on the $Na_2S_x$, which is less viscuous than sulfur by the factor 100, upwardly from the reaction vessel into the S tank. A sulfur and $Na_2S_x$ mix whose density and viscosity decrease with decreasing S content collects in this tank, which means that the S/Na$_2$S$_x$ mix becomes more fluid with increasing discharge due to the lowered viscosity and raised temperatures.

Referring to FIG. 1, an inner heat container in the form of a polished V4A steel radiation shield 1, which may also be goldplated, envelops the reaction aggregate 2 with the channel-like cathode spaces 3 and anode spaces 4 and the S or Na$_2$S$_x$ supply tank 5. A goldplated copper radiation shield 6 as outer heat container takes in the Na supply tank 7 in addition to the inner heat container 1. A simpler arrangement in which the S supply tank and the reaction aggregate would be on one temperature level would be restricted to the radiation shield 6 which would have to be fixed to the temperature level of the Na supply tank.

The sulfur supply tank 5, consisting of high-grade steel, is expediently lined with a graphite foil for corrosion protection. It prevents corrosion of the high-grade steel, which could dissolve in the sodium pulysulfide melt, because the polysulfide melt does not wet the graphite foil.

The Na supply line of V4A steel is composed of the thermally uncoupled capillary portion 8, the larger diameter portion 9 wound helically around the radiation shield 1, and the thermally uncoupled portion 10 leading to the anode space 4. The V4A line sections 11 and 12, connecting the reaction aggregate to the S or Na$_2$S$_x$ supply tank 5 carry the liquid cathode material in circulation and, by their helical design, take care to a great extent of the thermal uncoupling of the upper from the lower temperature level. An exchange diaphragm 13 separates the sodium pulysulfides formed as discharge products from the viscous sulfur.

The thermal uncoupling of the different temperature levels—which can be formulated roughly as 100° C.$\leq$T$\leq$200° C. for the Na supply tank,
200° C.$\leq$T$\leq$300° C. for the S, Na$_2$S$_x$ supply tank,
250° C.$\leq$T$\leq$350° C. for the reaction aggregate—extends also to the electric collectors, e.g. the cathode collector 14 and the anode collector 15.

The reaction aggregate is essentially identical with a solid electrolyte part designed as a reaction chamber and made entirely of ion-conducting material. Such a material is, for instance, $\beta$-Al$_2$O$_3$ or a mixed crystal of the general formula

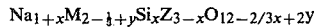

in which M is one of the transition metals Zr, Ti, Hf or mixtures thereof, of Group IV of the Periodic System, and Z is one of the elements, P, Sb, Bi, V, Nb, Ta or mixtures thereof of the Group V of the Periodic System, x is a number from 0.01 to 3
y is a number from 0 to 0.5

The container corrosion problem is obviated in this manner.

One particularly practical embodiment comparable to a hollow block brick is shown in FIG. 2 with the solid electrolyte part 16. Its interior is divided by a number of mutually parallel, plane channels with very thin partitioning walls forming the cathode spaces 3 and anode spaces 4 in alternating order. The anode space 4 with their feed-in openings 17 for the liquid Na are closed at one end, whereas the cathode spaces are open at the upper and lower end of the ceramic part through gapshaped breakthroughs 18. The very thin partitioning walls represent a solid electrolyte of extremely high conductivity.

Taking into consideration the viscosity properties of the S mass, which vary with the operating state of the cell, the cathode spaces are designed wider than the anode spaces. In addition to a graphite felt lining (not shown), the cathode spaces each contain a molybdenum current collector 20. These current collectors may be connected to a copper bus bar 22 provided with ceramic insulation 21.

The solid electrolyte part is completed by adding connector caps for the Na supply and for the supply or drainage of sulfur (not shown) and the required electric cabling to complete the reaction aggregate. The connector caps may be produced, for instance, as $\alpha$-Al$_2$O$_3$ formed parts and joined to the ceramic parts by means of glass solder.

Such an aggregate was calculated using the following data:

Outside dimension of aggregate = 4.1 cm $\times$ 8 cm $\times$ 34 cm = 1100 cm$^3$
5 sulfur channels 0.5 cm thick: 125 cm$^3$ chamber volume
6 sodium channels 0.16 cm thick: 41 cm$^3$ chamber volume
12 walls 0.05 cm thick.

The total active volume thus is 870 cm$^3$ and the total active exchange surface 2500 cm$^2$. On the basis of a specific conductance of $\delta_{300°}$ C. = 0.2 Ohm$^{-1}$cm$^{-1}$ the total resistance obtained with the above-mentioned mixed crystal material is 0.1 mOhm.

Loading with a mean current density of 0.1 A/cm$^2$ results in a total current of 250 A. A two hour operating period at a 2 V voltage requires a volumetric supply of $\frac{1}{2}$ liter Na and S each, with 60 mg Na and 120 mg S being reacted per second in the average.

Joule's heat loss of about 50 W on the average suffices to heat the given reaction quantities by the temperature difference of about 200° C.

What is claimed is:

1. Electrochemical storage cell comprising a part made of a ceramic, ioncontaining solid electrolyte material, constituting ceramic plates which have been sintered together and form mutually parallel rectangular channels with thin partitioning walls and with an upper end and with an opposite lower end, with alternate parallel rectangular channels having openings for feeding liquid sodium at the upper end and closed at the opposite end forming anode spaces and containing liquid sodium and parallel rectangular channels adjacent the alternate channels open at the upper and lower ends forming cathode spaces and containing liquid sulfur and cell reaction products, said openings at the upper end of the anode spaces connected to a separate sodium supply tank disposed away from said openings, said cathode spaces connected to a sulfur and cell reaction products supply, and metallic curent collectors extending into the cathode spaces, wherein said sodium supply is in the sodium supply tank with a temperature level of about 100°-200° C., and wherein said sulfur and cell reaction products supply is a supply tank for sulfur and cell reaction products (Na$_2$S$_x$) with a temperature level of about 200°-300° C., and wherein said solid electrolyte part has a temperature level of about 250°-350° C., and that the different temperature levels are thermally uncoupled by delay lines in conduit means connecting the anode spaces to the sodium supply, and in conduit means connecting the cathode spaces to the sulfur and cell reaction products supply, wherein the cell is enclosed by a radiation shield as an outer heat container reflecting heat radiating from the cell, wherein within said outer radiation shield is disposed an inner radiation shield enclosing as inner heat container the solid electrolyte part and the supply tank for sulfur and cell reaction products ($Na_2S_x$), wherein the delay lines are part sections of the sodium supply conduit and of the supply conduit for sulfur, respectively leading from a lower to a next higher temperature level and, wherein a first conduit section of the sodium supply line in the form of a capillary tube is connected to the sodium supply tank, an intermediate conduit section of the sodium supply line is wound helically on the inner radiation shield, a third conduit section of the sodium supply line is connected to the anode space, with the first, intermediate and third conduit sections in a relatively cool zone, an intermediate temperature zone and a warm zone respectively.

2. Electrochemical storage cell comprising a liquid sodium anode and a liquid sulfur cathode, which are arranged as a plurality of connected, parallel anode spaces and a plurality of connected, cathode spaces in a body made of a ceramic, ionconducting solid electrolyte material, said spaces having an upper end and an opposite lower end with the anode spaces open at the upper end, and closed at the opposite end, and with the cathode spaces open at the lower and the upper ends, said solid electrolyte body is a hollow block comprising profiled ceramic plates which are sinterend to each other, with the plates dividing the inner space of the block into a number of parallel channels with very thin intermediate walls, which parallel channels in alternating sequence form the cathode spaces and anode spaces, a sodium storage tank which is spatially separated from said body of solid electrolyte connected to the anode channels at their upper ends, a storage tank spatially separated from said body of solid electrolyte, for sulfur and reaction products of the cell, connected with said cathode channels at their upper and lower ends, and metallic conductors embedded in the cathode channels.

* * * * *